June 5, 1934.  R. STAUBO  1,961,868
MEANS FOR THE AUTOMATIC MANUFACTURE OF THREADED NUTS
Filed Sept. 24, 1932  4 Sheets-Sheet 2
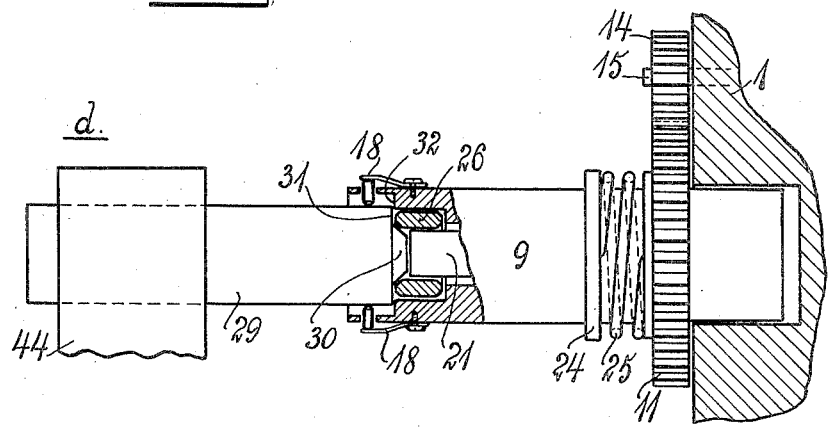
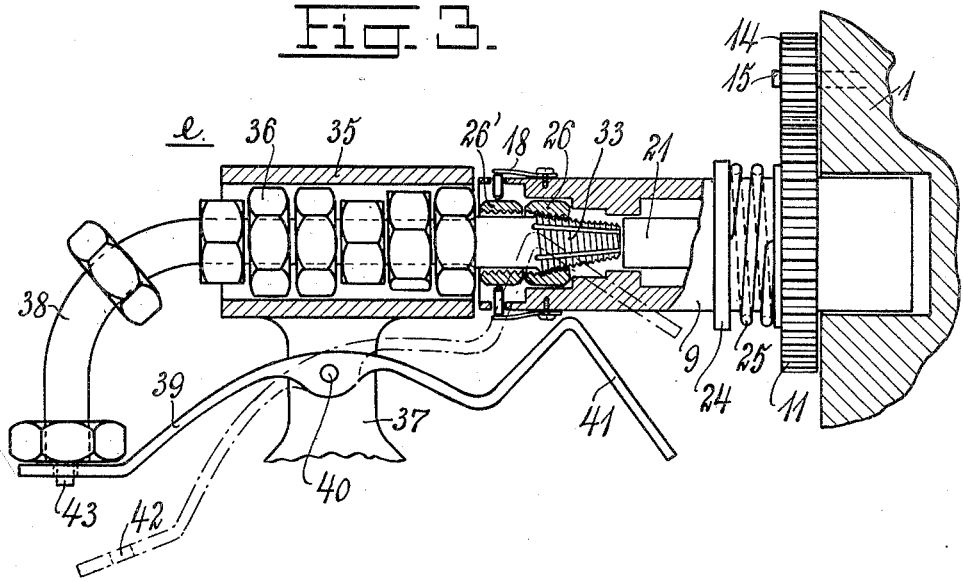
Inventor:
Rolf Staubo.
by Byrnes, Townsend & Potter,
Attorneys.

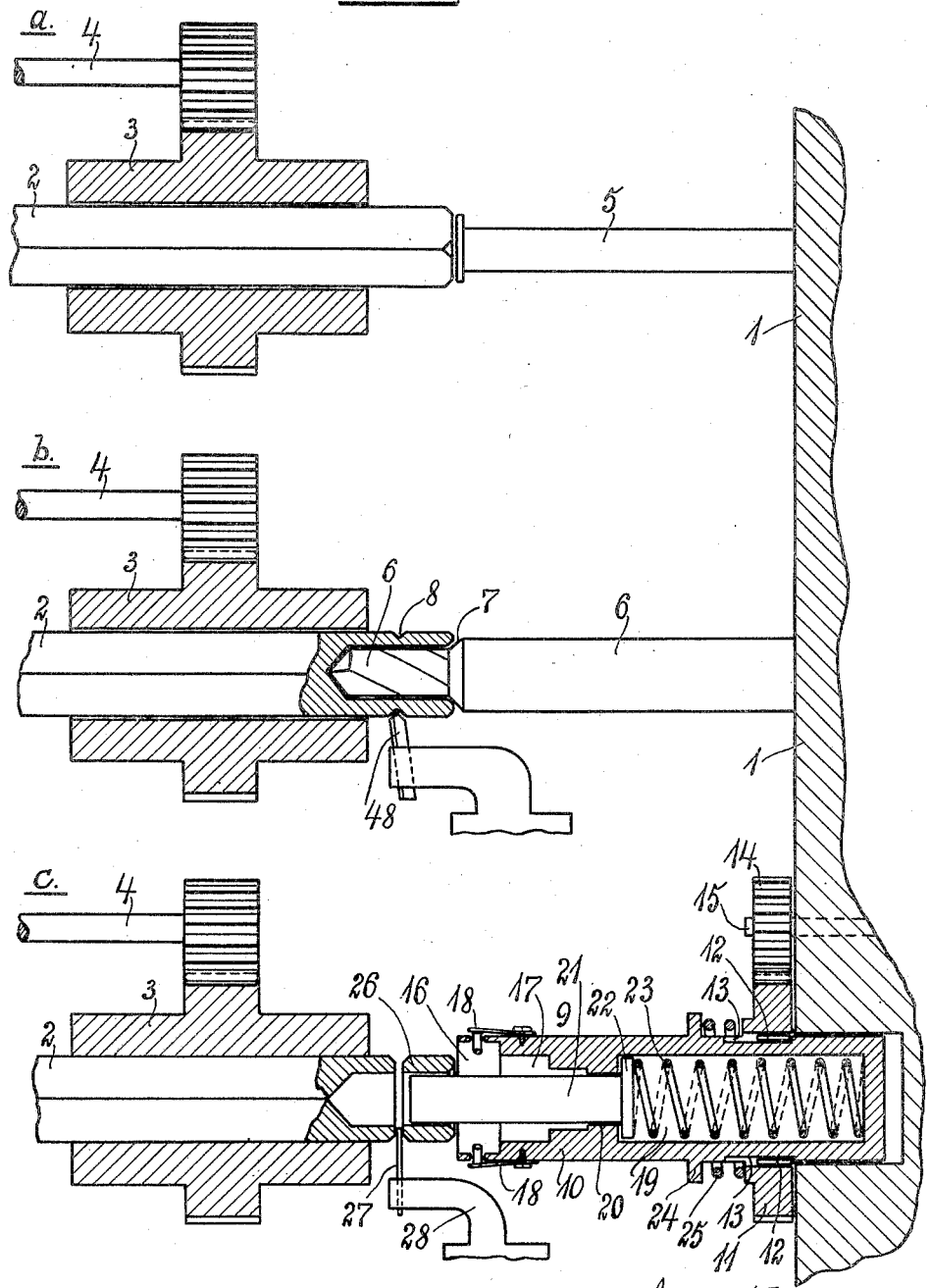

June 5, 1934.  R. STAUBO  1,961,868
MEANS FOR THE AUTOMATIC MANUFACTURE OF THREADED NUTS
Filed Sept. 24, 1932  4 Sheets-Sheet 3
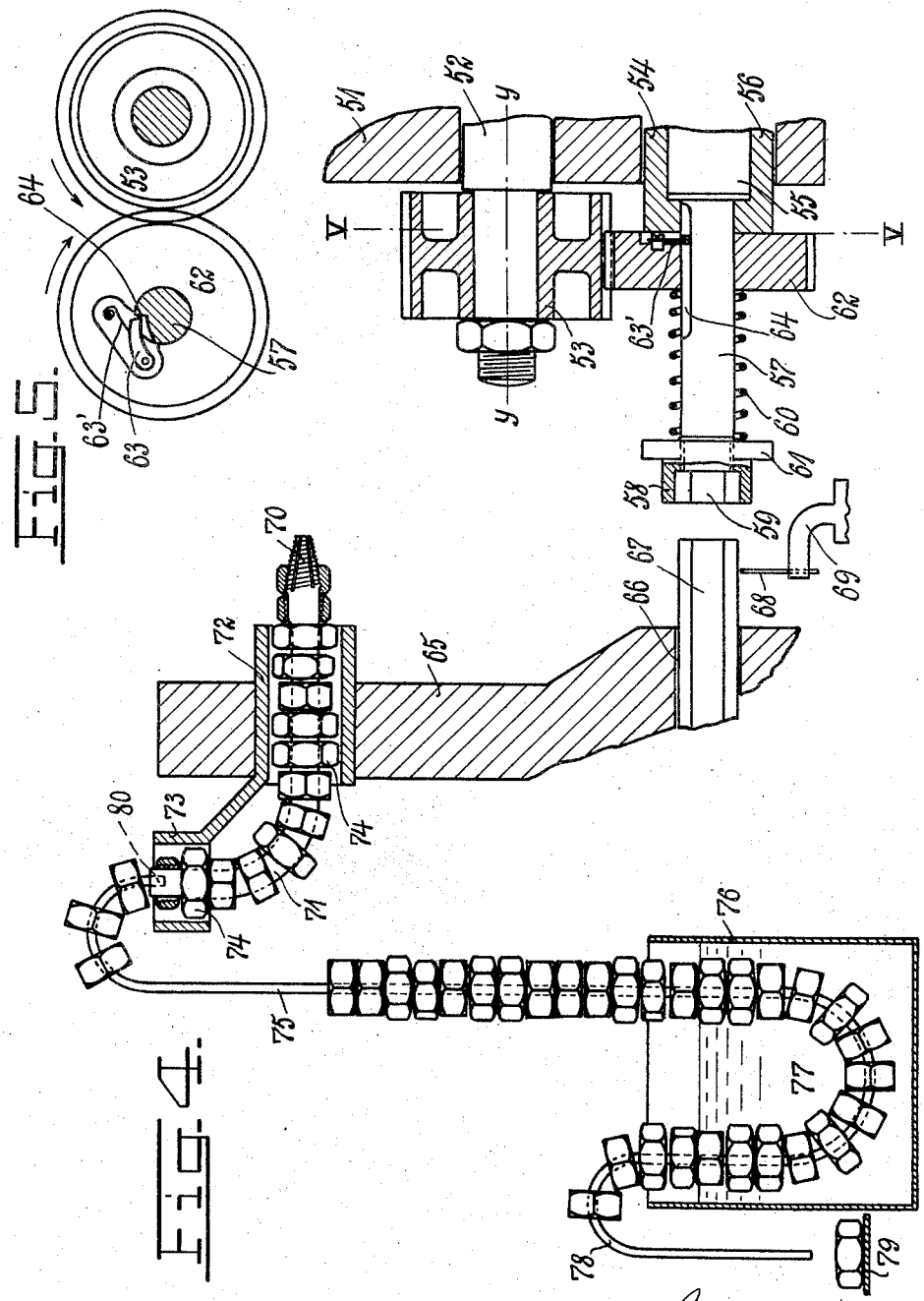

Inventor:
Rolf Staubo
By Potter, Pierce & Scheffler
Attorneys

Patented June 5, 1934

1,961,868

UNITED STATES PATENT OFFICE 1,961,868

MEANS FOR THE AUTOMATIC MANUFACTURE OF THREADED NUTS

Rolf Staubo, Skien, Norway

Application September 24, 1932, Serial No. 634,761
In Norway September 26, 1931

5 Claims. (Cl. 29—43)

The present invention relates to a method and a machine for the continuous manufacture of completely finished threaded nuts of any type, and is especially adapted to be operated in combination with any ordinary standard automatic lathe of the type which can be found in any mechanical manufacturing plant.

Previously, the manufacture of threaded nuts in automatic machines has been arranged in two or more steps, i. e. when the nuts are to be manufactured from a prismatic blank of metal, the first operation has consisted in drilling a hole through the said blank and cutting off suitable lengths of same, and in this operation the nut has usually also been provided with suitable bevel edges, as is common in all nuts. A quantity of this semi-finished product has then been carried to a nut drilling machine, where the nuts in automatic succession have been brought into contact with a threading tap, usually of the floating type, said tap being either of the stationary type with a revolving nut sleeve therearound, or in some cases the floating tap has been rotatably mounted in such a way that the nuts themselves have been held in non-rotating position.

These types of automatic machines are very complicated an expensive, and therefore smaller manufacturing companies have not been able to make their own nuts, but have been obliged to purchase same from other manufacturing companies specializing in the manufacture of such articles.

The main object of my invention thus is to provide means, whereby any small manufacturing companies, being in possession of an ordinary automatic lathe, can use same for the production of nuts of suitable size and shape in a continuous automatic way.

The type of automatic lathes above referred to comprises on a main frame means for rotating a blank and means for cutting off suitable lengths of same and has further arranged oppositely thereto a stepwise, rotatably mounted head, having means for holding working tools, excentrically positioned in relation to its axis and being at the same time arranged for longitudinal movements back and forth, for the purpose of bringing the tools into working contact with the rotating blank. More particularly my invention is applicable to an automatic lathe of the above mentioned type, comprising in addition to usual stationary tool holders a rotatably mounted tool holder which is rotated by means of suitable gearing from a shaft which is arranged through the shaft of the said head, and the principal object of this invention is to arrange in such rotatable holder a catcher, which rotates with a speed slightly different from the speed of the said blank, and which has a head provided with a recess of the same prismatic shape as the prismatic shape of the working blank, said catcher in one position of the said head being adapted to come into contact with the end of the said prismatic blank in such a way that the two after a short while, due to the difference in the rotating speed, will mesh with each other immediately before the semi-finished nut is loosened from the blank, whereafter the head in a commonly usual way is retracted and turned one step further, simultaneously as the catcher is being rotated about its own axis, whereafter the head, when it is moved forwards, will bring the nut in a rotating state into contact with other stationary working tools, arranged on the frame, until finally the nut by means of the said catcher is brought into contact with a floating tap, arranged in such a way that the nut will be provided with the internal threads as desired.

In connection herewith my invention thus consists in a novel arrangement of working tools, and further consists in novel washing means, serving to remove any dirt, which may be present on the finished nut after it has passed over the floating tap, this arrangement mainly consisting in a guiding rod, on to which the nuts are passed from the end of the floating tap, and by means of which the nuts are carried through a bath, for instance kerosene, and further discharged therefrom to any suitable container.

In order that this invention shall be readily understood and worked, it shall in the following be described with reference to the drawings, illustrating two preferred embodiments of the invention.

In the drawings,

Fig. 1 in a diagrammatical way illustrates the three first operations in the manufacture of nuts.

Fig. 2 illustrates the fourth operation.

Fig. 3 illustrates the application of the nut to the floating tap.

Fig. 4 illustrates a modified embodiment of the catcher and the washing process of the nuts, and Fig. 5 is a section through line V—V of Fig. 4.

Figure 6:
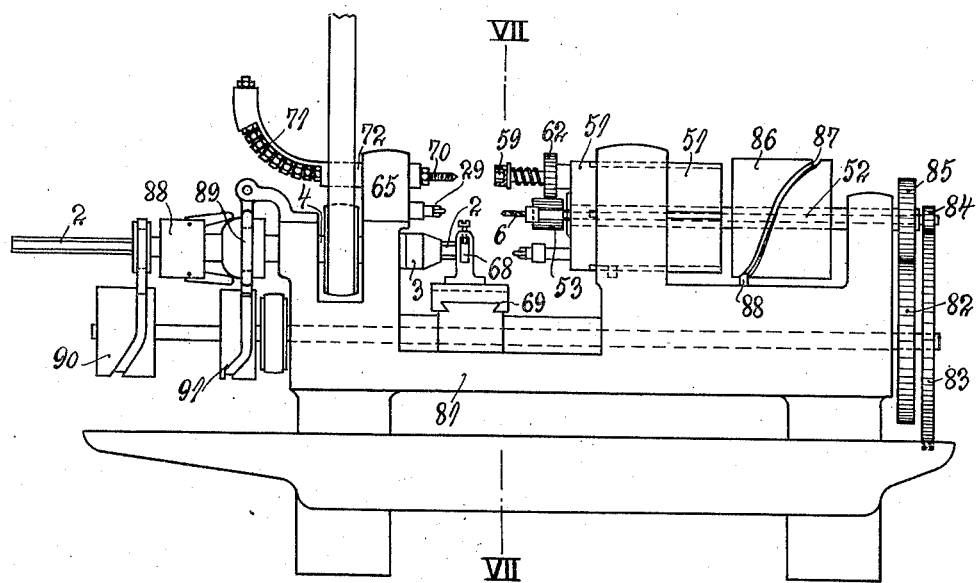
Fig. 6 is a longitudinal elevation of a lathe assembly embodying the invention.

In the drawings, Figs. 1, 2 and 3, the cross-hatched part 1 on the right side indicates a cross section through the head of an automatic lathe. On this head a number of working tools, which are used successively for the manufacture of nuts, are arranged in a manner known to anybody skilled in the art.

The first operation is in the drawings marked with a. Here is the working blank, which preferably consists of a sixsided prismatic rod 2, is fed in stepwise through a rotating sleeve 3 which in any suitable way is held in rotation by a driving shaft 4, which by suitable gearing (not shown) may be in connection with the main driving shaft of the machine. The sleeve 3 as well as the drive shaft 4 is arranged on the frame of the automatic lathe in any suitable way.

The working blank 2 is fed forward without certain control, and the head of the lathe moves at the same time in the opposite direction, whereby a projecting rod 5 comes into contact with the front end of the blank 2, moving this backwards a suitable distance, all in accordance with the dimension which it is desired to give the nut which is to be manufactured. In this position the working blank is caught by suitable means and held for further operations.

The next operation is marked with b. At this time the head of the lathe has revolved one step forward and has again moved in the direction towards the blank 2, and in this position the head is provided with a drill 6, preferably provided with a shoulder 7, which simultaneously with the drilling through the centre of the blank will provide the drilled hole with a bevelled edge at the end of the blank. Simultaneously with the drilling, a cutting steel 48 is brought against the working blank and cuts a double bevel 8, the right side of which will form the outside bevel on the nut which is manufactured at the present moment, and the left side of which will form a corresponding bevel on the next nut to be manufactured in the following operation.

When the drilling and the bevelling process as above mentioned has been finished, the head 1 is moved back and simultaneously therewith it is turned another step around its own axis in such a way that the next working tool 9—when the head again is moved forward, will come into contact with the blank as shown in step c in the drawings, Fig. 1.

The working tool 9 is a catcher which comprises a hollow member 10, rotatably arranged in the head 1 or on suitable holder fastened to same. The catcher 9 may be provided with a gear 11, which meshes slidably with the hollow member 10 by means of keys 12. The gear 11 is in mesh with another gear 14 which is keyed to a shaft 15, which projects through the shaft carrying the head 1. This arrangement is in the drawings shown diagrammatically, due to the fact that it is well known to persons skilled in the art.

Most of the automatic lathes in the market are provided with such driving means for the purpose of providing one rotatable working tool on the head.

At the outer end, the member 10 is open and may first have a cylindrical opening 16, the diameter of which is at least as large as the greatest diameter of the nut which is to be manufactured. The cylindrical space 16 is extended backwards into another space 17, which has a shape substantially corresponding to the shape of the nut to be manufactured. In the cylindrically shaped space 16, spring members 18 are provided. These members serve to guide the nut, when it is moved into the space in such a way that it will take a position so that its outside shape will correspond to the inside of the shape of the space 17. Between the spaces 16, 17 and the rear space 19 in the member 10 a shoulder 20 with less diameter is provided. This shoulder serves as guide for the piston 21 which in the space 19 has a shoulder 22 which is under the influence of a spring 23, serving to push the tap 21 out as far as possible. Adjacent to the gear 11, the member 10 is further provided with a shoulder 24, between which and the gear a spring 25 is arranged for a purpose which will be described later on.

In the step c the following operation takes place:

The head 1 is moved forward, and the tap 21 passes into the hole in the nut blank 26. The tap 21 is thus adapted to carry the nut 26, while a steel 27, which is carried by an arm 28, severs the nut blank from the blank 2. The nut blank 26 is thus, when it is loosened from the blank 2, carried by the tap 21, and the head is moved back and rotated one step forward. Under these movements, the nut blank will follow the catcher 9.

The above described embodiment of the catcher may be simplified as will be described later on in connection with Fig. 5.

In the operation d, which is shown in Fig. 2, the catcher 9 is moved against a stationary tool 29, which serves to provide an inside bevel in the nut blank. The tool 29 comprises the bevel knives 30 and a shoulder 31. As the tap 21 and the nut blank 26 are moved against the bevel tool 29, as the head of the automatic lathe is moved forward, the tap 21 is moved backwards, against the action of the spring 23; at the same time the catcher is rotated as above described. The nut is thereby forced into the cylindrically shaped space 16 and will under the action of the spring 18 be arranged in such position that it will move into the space 17, where the nut is forced to rotate with the same speed as the catcher 9, and the nut will thus be bevelled, when it is forced against the bevel tool 29. If, for some reason, the head of the lathe should move further forward, the spring 25 will allow the catcher 9 to move backwards in relation to the said head, whereby the parts are not subjected to any undesirable stresses.

The nut blank 26 which now is located in the prismatic space 17 in the catcher 9 will in the next retraction and rotating of the head be moved into position directly opposite the threading tap 33, the shaft 34 of which is carried in the sleeve 35 by means of the already finished nuts 36. The tap 33 is in a manner known in the art prevented from rotating in relation to the sleeve 35, which again is attached to the frame 37 due to the fact that the shaft 35 is provided with a bend 38 which in a suitable way is held in such a way that no rotation is allowed.

The rotating catcher 9 with the nut blank 26 is moved towards the stationary tap 33, and the nut blank is thus provided with threads. The catcher 9 will remain in this position until the nut blank 26 has moved beyond the cutting part of the tap 33, i. e. until it will take the position of the finished nut marked 26' in Fig. 3. When the nut blank has taken this position, the head of the lathe will move back and be ready for the next operation. The fact that the nut blank 26 is forced backwards on the tap will cause the already finished nuts 36, which are located on the shaft 34 in the sleeve 35, to move backwards. One of these nuts will thus, each time a new nut blank has passed over the thread cutting part of the tap, pass beyond the bend 38 of the shaft and fall down against the member 39, which member preferably may be arranged in such a way that, as soon as the catcher 9 is moved back, it will release the nut and let it drop down. This member is, however, not a necessary part of my invention, which will be understood from the following description; but if it is desired to use such a member, it may for instance be arranged as shown in Fig. 3, where it consists in an arm 39, pivotally journalled at 40 on the frame member 37 and provided with a camlike extension 41, which—when the catcher 9 is moved forward—will be forced down in such a way that the left end of the arm 39, which may be provided with a hole 42, is brought up in mesh with the tap 43 at the end of the shaft 38, whereby the rotation of the threading tap is prevented. As soon as the catcher 9 is retracted, the arm 39 will swing down and take the position which is indicated in dotted lines in Fig. 3.

It will easily be understood that this invention is in no way limited to the above described type of floating tap, which will appear from the following description of the preferred embodiment of the invention illustrated in Figs. 4 and 5. In this embodiment is shown a simplified catching member and a method whereby the finished nuts—as they leave the shaft of the floating tap—are guided through the washing arrangement, so that not only finished nuts, but clean, washed nuts will be furnished from the automatic machine.

For simplification of description and illustration, a number of the working steps above described in Figs. 1–3 have been omitted from these figures.

One special feature in the embodiment shown in Figs. 4 and 5 is the fact that the catcher, instead of being provided with means for guiding the nut blank into a recess, in which it can be held for rotation when it is brought into contact with stationary tools, will catch the nut blank and receive it in the recess, due to the fact that the rotation of the said nut blank and the rotation of the said catcher differ a little in relation to each other in such a way that the catcher can be brought directly against the head of the nut blank, and after a short while the recess in said catcher which corresponds to the shape of the nut will mesh with same so that the nut blank will slip into the recess.

The head is in a common way rotatably arranged about an axle $y$ and a shaft 52 which carries a gear 53, is arranged in a common way through the shaft of the head. The catcher, which is rotatably mounted excentrically to the axle $y$ on the head 51, consists in a shaft 55, journalled in a holder 56. The shaft 55 has a forwardly extending extension with a head 58. The head 58 is provided with a prismatic recess 59, the shape of which corresponds to the shape of the nut which is to be manufactured. The shaft 55 and the extension 57 are slidably arranged in the longitudinal direction in the holder 56 and are maintained in the extended position by means of a spring 60, which on the one side bears against a collar 61 and on the other side against a gear 62 which is in mesh with a gear 53.

The gear 62 is prevented against rotation in a clockwise direction in relation to the shaft 57 by means of a ratchet mechanism 63, which meshes with a longitudinally extending slot 64 in the shaft 57, but can rotate freely in the other direction.

65 represents a portion of the stationary frame of the automatic lathe. In this there is arranged an aperture 66, through which a working blank 67 is fed towards the head 51. The blank 67 in the automatic lathe is connected to a driving member, which gives the same a continuous fixed rotating movement. At a suitable distance from the working blank a knife 68 is provided. This knife is carried in a holder 69 and can in a suitable way be moved towards the working blank 67.

According to this embodiment of the invention, the different gears and driving means have been chosen in such a way that the speed of rotation of the shaft 57 under the action of the gears 62, 53 and the shaft 52 will be slightly different, preferably less than the rotation of the working blank 67.

When therefore the head 51 is moved forward, i. e. towards the left in the drawing, the head 58 will come into resilient contact with the working blank 67, and due to the fact that the working blank 67 and the head 58 rotate with slightly different speed, the head 58 will after a short duration mesh with the end of the working blank 67, and the shaft 57 will thereafter rotate with the same speed as the working blank. This speed of the head 58 and the shaft 57 will be maintained until the knife 68 has severed one nut blank from the working blank 67. Thereafter the gear 62 will take over the rotation of the shaft 57 and the head 58 by means of the ratchet mechanism 63.

When the nut blank has been loosened from the working blank 67, the head 51 will be moved backwards and will be turned around its axis, until the catcher will be in a position directly opposite a floating thread tap 20. When the head of the automatic lathe then again is moved forward, the nut blank will be moved into contact with the tap 70, while the nut is rotated with the same speed as the shaft 57.

In the embodiment shown in Fig. 4, the floating tap 70 is carried in two sleeves 72, 73, arranged in angle to each other. These sleeves are again fastened to the frame 65 of the lath. When a new nut has moved over the tap 70, a finished nut will be given off from the end of the tap shaft 71.

According to the invention, it is now at the end of the shaft 71 arranged a curved guide 75 which in the shape of an S extends from the said end of the tap 71 and is drawn into a washing fluid container 76. As washing fluid may be used kerosene 77. The rod 75 extends in a new bend 78 from the container over the edge of same and is adapted to discharge the nuts to any container or transporting arrangement 79. Preferably, a recess 80 is arranged in the end of the tap 71, the rod 75 extending into this recess. When the nut thus has been finished from the tap 70 and has been pushed along the shaft 71, it is taken over by the rod 75 and is guided through the container 76, where it will be washed off in the washing fluid 77. As new nuts are produced, the finished nuts will be pushed off the end 70 of the rod 75 and will, one after another, fall off into the container or transporting means 79.

Figure 7:
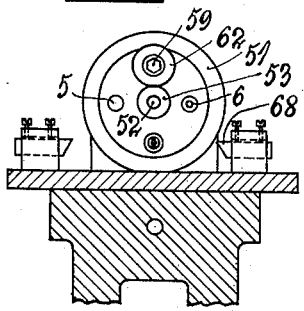
Fig. 7 is a partial transverse sectional view on line VII—VII of Fig. 6 looking toward the head of the lathe.

It will be understood that the machine above described will provide a completely automatic machine which from the prismatic blank 2, 67 will be able to provide completely finished and washed nuts of any desired type or size. In the complete lathe assembly shown by way of examples in Figs. 6 and 7, there is shown in addition to the elements and features described above, conventional lathe elements, including the lathe frame 81, driving gears 82, 83, 84, 85, a cam cylinder 86 with a cam slot 87 for guiding the head 1 back and forth, clutch members 88 and 89 for guiding and feeding the blank, and cams 90 and 91 for guiding said clutches.

I claim:—

1. In an automatic lathe, two sets of working implements, arranged opposite to each other concentrically about the axis of the head of the lathe, one set of which is stationarily arranged on the frame of the lathe and the other fixed to the head of the lathe, which head is slidable in the direction of its axis on said frame and rotatable about its axis, the first mentioned set of working implements comprising a work holder, adapted to hold a rod-like working blank, means for driving said holder at a fixed speed of rotation, and a screw threading floating tap arrangement, and the second set of working implements comprising a rotatably held working implement, driving means being provided on the head to rotate said implement at a fixed speed slightly different from the speed of said working blank and comprising a ratchet mechanism providing for an increase in the speed of rotation of said implement over the normal driving speed of said driving means in the period in which it is in engagement with the working blank prior to the cutting off of a piece thereof, cutting tools arranged on said frame, adapted to cut said blank transversely to its axis of rotation and means arranged on the frame for stepwise feeding of said blank in axial direction each time a piece is cut off, and to force said head to move back and forth and turn stepwise about its axis each time one working operation is completed, said rotating working implement on the head of the lathe comprising an axially yielding spring actuated forwardly extending catching member, adapted to be brought into contact with and engage the end of said working blank immediately before a piece is cut off the end of same and in a state of rotation about its axis to carry said piece in working contact with further working implements of said stationary set and said implement having a head with a recess having the same internal configuration as the outside shape of the working blank, all for the purpose of manufacturing completely finished nuts.

2. In an automatic lathe for the automatic manufacture of threaded nuts in an automatic lathe, comprising two sets of working implements, arranged opposite to each other concentrically about the axis of the head of the lathe, one set of which is stationarily arranged on the frame of the lathe and the other fixed to the head of the lathe, which head is slidable in the direction of its axis on the said frame and rotatable about its axis, the first mentioned set of working implements comprising a work holder, adapted to hold a rodlike working blank, means for driving the said holder at a fixed speed of rotation, a screw threading floating tap arrangement and a beveling tool, and the second set of working implements comprising a rotatably held working implement, means on the head to rotate the said implement at a fixed speed, a drill, cutting tools arranged on the said frame, adapted to cut the said blank transversely to its axis of rotation and means arranged on the frame for stepwise feeding of the said blank in axial direction each time a piece is cut off, and to force the said head to move back and forth and turn stepwise about its axis each time one working operation is completed.

3. In an automatic lathe for the automatic manufacture of threaded nuts in an automatic lathe, comprising two sets of working implements, arranged opposite to each other concentrically about the axis of the head of the lathe, one set of which is stationarily arranged on the frame of the lathe and the other fixed to the head of the lathe, which head is slidable in the direction of its axis on the said frame and rotatable about its axis, the first mentioned set of working implements comprising a work holder, adapted to hold a rodlike working blank, means for driving the said holder at a fixed speed of rotation, a screw threading floating tap arrangement and a beveling tool, and the second set of working implements comprising a rotatably held working implement, means to rotate the said implement at a fixed speed, a drill, cutting tools arranged on the said frame, adapted to cut the said blank transversely to its axis of rotation and means arranged on the frame for stepwise feeding of the said blank in axial direction each time a piece is cut off, and to force the said head to move back and forth and turn stepwise about its axis each time one working operation is completed, said floating tap arrangement being provided with an extension at its rear end adapted to receive the finished nuts and guide them through a washing bath.

4. In a nut making machine, means for cutting off short pieces of a rotating working blank having a central hole, rotating means for catching said pieces and transporting same in a planetary movement to a floating tap arrangement and to force the piece onto the said tap, and means in connection with the end of the said tap, adapted to guide the said pieces through a washing bath.

5. A machine according to claim 4 wherein the said means for guiding the nut blank through a washing bath consists in a curved rod in mesh with the end of the shank of the said floating tap and passing through a washing bath.

ROLF STAUBO.